United States Patent
Tinskey et al.

(10) Patent No.: US 10,367,869 B2
(45) Date of Patent: Jul. 30, 2019

(54) REMOTE VEHICLE CONTROL AND OPERATION

(71) Applicants: Ford Global Technologies, LLC, Dearborn, MI (US); Georgia Tech Research Corporation, Atlanta, GA (US)

(72) Inventors: Michael Robert Tinskey, Commerce, MI (US); Donna L. Bell, Southfield, MI (US); David McCreadie, Ann Arbor, MI (US); Renuka Vikram Gokhale, Farmington Hills, MI (US); Ghassan AlRegib, Johns Creek, GA (US); Tariq Alshawi, Atlanta, GA (US); Mohammed Aabed, Atlanta, GA (US); Berdinus Bras, Atlanta, GA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 14/882,781

(22) Filed: Oct. 14, 2015

(65) Prior Publication Data

US 2016/0191861 A1 Jun. 30, 2016

Related U.S. Application Data

(60) Provisional application No. 62/097,633, filed on Dec. 30, 2014.

(51) Int. Cl.
*H04L 29/06* (2006.01)
*H04L 29/08* (2006.01)

(52) U.S. Cl.
CPC ........ *H04L 65/4092* (2013.01); *H04L 65/604* (2013.01); *H04L 67/12* (2013.01)

(58) Field of Classification Search
CPC .... H04L 65/4092; H04L 67/12; H04L 65/604
See application file for complete search history.

(56) References Cited

U.S. PATENT DOCUMENTS

| 8,355,834 | B2 | 1/2013 | Duggan et al. | |
|---|---|---|---|---|
| 8,577,538 | B2 | 11/2013 | Lenser et al. | |
| 2008/0300766 | A1* | 12/2008 | Kumabe | B60K 31/0075 701/98 |
| 2010/0073503 | A1* | 3/2010 | Tanaka | G06F 9/4831 348/222.1 |

(Continued)

FOREIGN PATENT DOCUMENTS

KR 950011491 10/1995

OTHER PUBLICATIONS

Cummings, M.L., et al., Massachusetts Inst of Tech Cambridge, Automation Architecture for Single Operator, Multiple UAV Command and Control, 2007, p. 29.

(Continued)

*Primary Examiner* — Tat C Chio
(74) *Attorney, Agent, or Firm* — Frank A. MacKenzie; Bejin Bieneman PLC

(57) ABSTRACT

A plurality of data streams are received from a vehicle, at least one of the data streams including multimedia data. A prioritization of the data streams is performed according to one or more factors. At least one of adjusting at least one of the data streams and preventing transmission of at least one of the data streams according to the prioritization is performed.

17 Claims, 2 Drawing Sheets

(56) References Cited

U.S. PATENT DOCUMENTS

| | | | | |
|---|---|---|---|---|
| 2011/0110397 A1* | 5/2011 | Mochizuki | ............ | H04W 28/20 |
| | | | | 375/130 |
| 2015/0203125 A1* | 7/2015 | Penilla | .................. | G06F 21/445 |
| | | | | 701/1 |
| 2015/0381686 A1* | 12/2015 | Hurst | ............... | H04N 21/23439 |
| | | | | 709/231 |
| 2016/0288717 A1* | 10/2016 | Kameshima | .............. | G06T 7/73 |
| 2017/0069205 A1* | 3/2017 | Nguyen | ............... | G08G 1/0112 |

OTHER PUBLICATIONS

MIT Humans and Automation Lab, Human-Automation Collaboration for Unmanned Vehicle Control; May 19, 2014.

* cited by examiner

REMOTE VEHICLE CONTROL AND OPERATION

CROSS REFERENCE TO RELATED APPLICATION

This application claims priority to U.S. Provisional Application Ser. No. 62/097,633 filed Dec. 30, 2014, which is hereby incorporated herein by reference in its entirety.

BACKGROUND

Remotely controlled vehicles relay data from various sensors, e.g., image data from cameras, mounted on a remotely controlled vehicle. For example, an operator remotely controlling one or more vehicles may have available views provided by multiple cameras on a vehicle. Unfortunately, mechanisms for managing and efficiently providing such views to a remote control site, and for optimizing a quality of experience of a remote operator of a vehicle, are lacking.

DETAILED DESCRIPTION

System Overview

Figure 1:
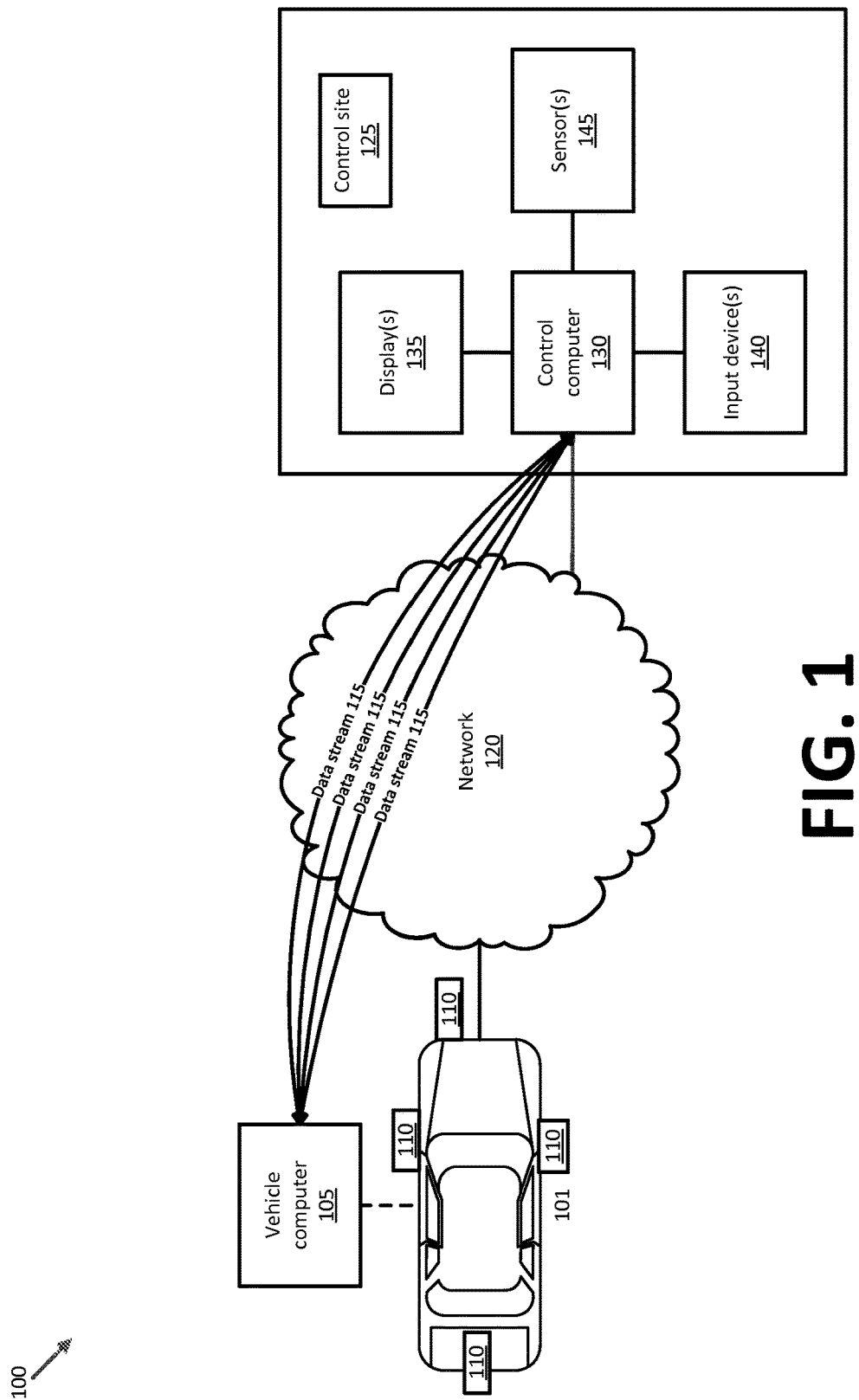
FIG. 1 is a block diagram of an exemplary remote controlled vehicle system.

FIG. 1 is a block diagram of an exemplary remote controlled vehicle system 100, including one or more vehicles 101, operations of each vehicle 101 being managed from a remote control site 125. A vehicle 101 computer 105 collects and processes data from various sensors, e.g., in the examples discussed herein, multimedia sensors 110. Data from the multimedia sensors 110 is processed and then provided, e.g., in respective data streams 115, via a network 120 to a control and an operating computer 130 in a remote control site 125. The control and operating computer 130 is generally programmed to provide data from one or more of the streams 115 in one or more displays 135, and to allow an operator in the site 125 to provide inputs, e.g., via input devices 140, to operate, e.g., control steering, speed, etc., of the vehicle 101.

The computer 130 is further programmed to prioritize and/or adjust the data streams 115 to be provided in the one or more displays 135 according to one or more factors. For example, adjustment of the data streams 115 could include adjusting a size and/or resolution of a video image provided by a stream 115; alternatively or additionally, a physical adjustment to a multimedia sensor 110 could be made according to an instruction from the control computer 130, e.g., to move a multimedia sensor 110 horizontally, rotationally, and/or vertically to alter a view provided to a vehicle operator. Further for example, prioritization of the data streams could include determining or ranking a relevance of data streams 115 from respective multimedia sensors 110 in the vehicle 101. Factors relevant to alteration and/or prioritization of the data streams 115 could include an amount of bandwidth and end-to-end delay in the network 120 determined to be available for data streams 115 from the vehicle 101 to the control site 125. Further relevant factors could include a direction and/or speed of travel of the vehicle 101, indications sensed from an operator in the control site 125, motion and events that warrants the operator's attention in a certain direction, etc.

Exemplary Process Flows

The system 100 could include two or more vehicles 101; a single vehicle 101 is shown in FIG. 1 for ease of illustration. A vehicle 101 includes a vehicle computer 105 that generally includes a processor and a memory, the memory including one or more forms of computer-readable media, and storing instructions executable by the processor for performing various operations, including as disclosed herein. The memory of the computer 105 further receives and stores data from vehicle 101 sensors such as multimedia sensors 110.

Accordingly, the computer 105 is generally configured for communications on a controller area network (CAN) bus or the like in a known manner. The computer 105 may also have a connection to an onboard diagnostics connector (OBD-II). Via the CAN bus, OBD-II, and/or other wired or wireless mechanisms, the computer 105 may transmit messages to various components 107 in a vehicle and/or receive messages from the various components 107, e.g., controllers including electronic control units (ECUs) such as are known, actuators, sensors, etc., including multimedia sensors 110. In addition, the computer 105 may be configured for providing data streams 115 and/or sending and receiving other communications, via the network 120, which, as described below, may include various wired and/or wireless networking technologies, e.g., cellular, Bluetooth, wired and/or wireless packet networks, etc.

Data streams 115, e.g. data streams and/or control streams, are used to provide real-time or substantially real-time data from the vehicle 101 computer 105 to the computer 130. Data streams 115 may be provided according to known protocols such as "webRTC" (Web Real-Time Communication), FFmpeg, TCP Friendly UDP, or the like. webRTC, as is known, includes a system for streaming media that is being developed by the World Wide Web Consortium (W3C), including sets of APIs (application programming interfaces) to interface with the streaming system. Likewise, FFmpeg is a known set of open source libraries for handling streaming multimedia data including video data. Although referred to herein primarily as comprising video data, it is to be understood that a data stream 115 may also include audio data, and that techniques disclosed herein for managing data streams 115 apply in the case of audio data in addition or as an alternative to video data in a data stream 115. Further, in addition to including video and/or audio data in a multimedia stream such as is known, a data stream 115 may include other sensor data as well as vehicle 101 data, e.g., the computer 105 may provide data relating to vehicle 101 speed, direction of travel, acceleration, deceleration, steering angle, rate of change of steering angle, etc.

The data streams 115 may include data about environments, e.g., a representation of vehicle 101 surroundings, etc. Instead of audio and video data, which may require large amounts of bandwidth, the computer 105 may be programmed for feature extraction and scene analysis of the video data. For example, the video data may be processed with known techniques to remove details of objects far from the vehicle 101 or irrelevant to operation of the vehicle 101. The altered video data stream 115 may have a lower bandwidth requirement with lower end-to-end delay than prior to alteration.

The data streams 115 may include control data, i.e., data for controlling various vehicle components, e.g., a steering system, a suspension system, etc. An exemplary data stream 115 may include only control data, or may include both control data and sensor data; i.e., some of the data streams 115 may be dedicated specifically for control data. For example, control data may include instructions to a vehicle 101 electronic control unit (ECU) or the like to actuate or modify operation of a vehicle component, e.g., to adjust a vehicle 101 throttle, to accelerate or brake to a given speed, to change a steering angle, etc.

The data streams 115 may further include telemetry data, i.e., vehicle system data collected from vehicle telemetry sensors 106. The vehicle telemetry sensors 106 may include, e.g., a battery level indicator, a vehicle balance sensor, engine condition sensors, tire pressure sensors, etc. The telemetry data may include, e.g., a battery level, a vehicle balance, a condition of an engine, tire pressure, processing load on the computer 105, traceability of a video processing algorithm, stability of a control system, etc. The telemetry data may be stored in the computer 105 and sent to the control computer 130 via the network 120. The data streams 115 may further include environmental data, i.e., data of the surrounding environment collected with environmental sensors 108. The environmental sensors 108 may be of any known type, including radar, lidar, photodetectors for ambient lighting, etc.

Multimedia sensors 110 may include a variety of known video cameras for capturing and providing video data to the computer 105, e.g., in a known format such as an MPEG (Motion Picture Experts Group) standard such as is known. Accordingly, the data stream 115 provided from the vehicle computer 105 to the control computer 130 via the network 120 may include MPEG data. It is to be understood that different numbers of multimedia sensors 110 could be mounted in or on the vehicle 101, four multimedia sensors 110 being shown in FIG. 1 for purposes of illustration. For example, a single multimedia sensor 110 with a 360 degree capture angle may be used. Further, it is to be understood that multimedia sensors 110 that could be included in various locations on the vehicle 101, again, multimedia sensors 110 being shown on respective sides, and a front and back, of the vehicle 101 for purposes of illustration.

It is moreover to be understood that the computer 105 may receive data from devices and components 107 in the vehicle 101 not shown in FIG. 1, and may provide such data to the computer 130 via the network 120. Further, the data stream 115 (including video) transmitted to computer 130 could include raw data from the various sensors or processed by computer 105 before streaming. For example, the computer 105 may receive data from a global positioning system (GPS) device and/or other navigation devices in the vehicle 101. Likewise, sensors 108 in addition to multimedia sensors 110, e.g., radar, lidar, ultrasonic sensors, etc. may be included in the vehicle 101 and may provide data to the computer 105 to aid in vehicle 101 operations, including navigation. In addition, the computer 105 is programmed to receive instructions from a control computer 130 via the network 120 concerning control of the vehicle 101. According to instructions received from the computer 130, the computer 105, e.g., according to known mechanisms, may instruct various vehicle 101 components, e.g., throttle, brakes, steering, etc. to take various actions such as turning, accelerating, decelerating, etc. the vehicle 101.

The network 120 represents one or more mechanisms by which a vehicle computer 105 may communicate with a remote server 125. In one example, the network 120 comprises a cellular network, the computer 105 being equipped with, or communicatively coupled to in the vehicle 101, a cellular modem such as is known for communicating on a cellular network. In general, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks, in addition to a cellular network as already mentioned, include wireless communication networks (e.g., using Bluetooth, IEEE 802.11, etc.), local area networks (LAN) and/or wide area networks (WAN), including the Internet, providing data communication services.

The control site 125 is generally geographically remote from the vehicle 101, i.e., the vehicle 101 is generally in a location that cannot be physically or directly seen from the control site 125. Thus, to control the vehicle 101, the control site 125 includes one or more control computers 130, each generally including at least one processor and at least one memory, the memory storing instructions executable by the processor, including instructions for carrying out various of the steps and processes described herein. The computer 130 may include a volatile memory, non-volatile data storage, etc., and/or may be communicatively coupled to a data store 130 for storing usage data 115, records relating to potential incidents generated as described herein, etc. Further, the computer 130 is generally programmed to receive inputs from one or more input devices 140 that may be controlled by a human operator in the control site 125, as well as from one or more sensors 145 that may provide data concerning the operator. As mentioned above, the computer 130 is generally programmed to provide instructions to the vehicle computer 105 to control operations of the vehicle 101.

The control site 125 may include a central command computer 150. The central command computer 150 coupled to the control computer 130 includes a processor and a memory, the memory storing instructions executable by the processor. The central command computer 150 may be programmed to manage a plurality of computers 130, each computer 130 controlling a single vehicle 101. The central command computer 150 is programmed to collect data from the computers 130 and to manage tasks for the fleet of vehicles 101, e.g., to synchronize operations of the computers 130, to initialize and terminate control sessions of the vehicles 101, to manage handover of a session between different operators, etc.

Display devices 135 coupled to the computer 130 generally include two-dimensional displays, e.g., flatscreen monitors or the like, such as are known. The display devices 135 are generally used to display one or more video images from one or more data streams 115.

Input devices coupled to the computer 130 may include known devices such as a keyboard, joystick, trackball, etc. Using such input devices in a known manner, and operator in the site 125 may provide instructions for remote control of the vehicle 101.

Sensors 145 may include cameras or other sensors in the control site 125 for tracking movements of the human operator. For example, cameras can be deployed in a known manner to detect eye movements and/or a direction of gaze of an operator. Thus, data provided from one or more sensors 145 to the computer 130 can be used by the computer 130 to determine an image or images being viewed by the operator. Accordingly, as discussed further below, the computer 130 can prioritize data streams 115 at least in part according to a particular video image or images of present interest to the operator from a vehicle 101.

Exemplary Process Flows

Figure 2:
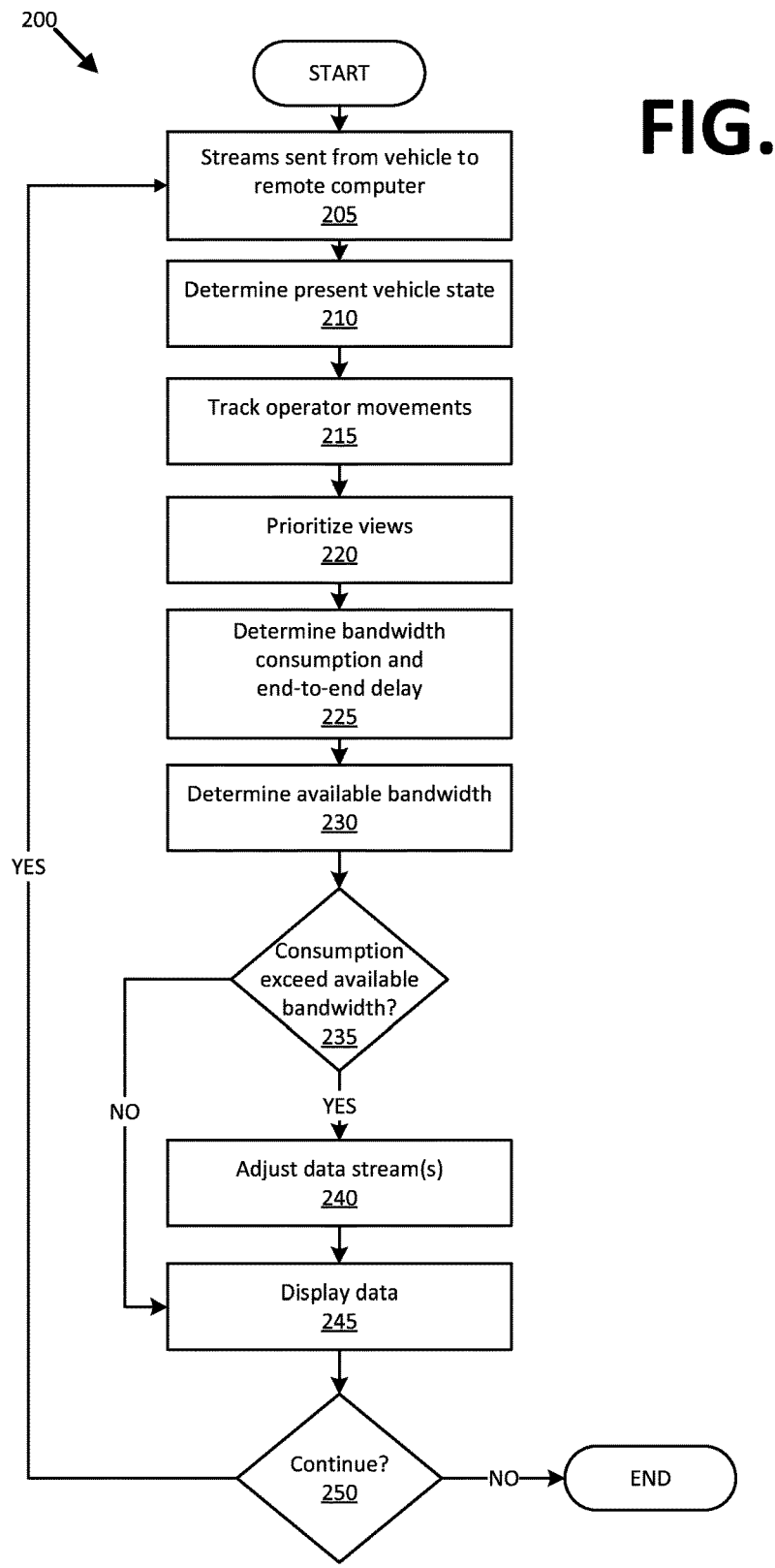
FIG. 2 is a diagram of an exemplary process for adjusting a display in a remote control site.

FIG. 2 is a diagram of an exemplary process 200 for adjusting a display 135 in a remote control site 125. Various steps of the process 200 are carried out according to instructions executed by one or more of the computers 105, 130.

The process 200 begins in a block 205, in which the vehicle 101 computer 105 provides multiple data streams 115 to the computer 130. As mentioned above, a computer 105 generally provides one or more multimedia data streams 115, e.g., including MPEG video data or the like, from respective multimedia sensors 110 mounted in or on the vehicle 101. In addition, as also mentioned above, the computer 105 generally provides a data stream or streams 115 including data related to vehicle 101 operation, e.g., velocity, direction of travel, steering angle, steering angle rate of change, etc. Following the block 205, the process 200 proceeds to a block 210.

In the block 210, which may follow either the block 205 or a block 250, the computer 130 determines a vehicle 101 state. As used herein, the term "vehicle state" may include a variety of vehicle 101 attributes, including a real-time or substantially real-time vehicle 101 speed, direction of travel, steering angle, steering angle rate of change, etc. The vehicle state may further include an orientation of one or more multimedia sensors 110, e.g., a vertical and/or horizontal angle of the multimedia sensor 110 with respect to a longitudinal and/or lateral axis of the vehicle 101.

Following the block 210, in a block 215, the computer 130 receives data from sensors 145 indicating movements of a human operator, e.g., indicating movements of the operator's head, a direction of gaze or a change in direction of gaze based on images of the operator's eyes, etc. Such data may be provided to the computer 105, e.g., indicating a priority or weighting to be given to one or more multimedia sensors 110 because of behavior of an operator in the remote site 125.

Following the block 215, in a block 220, the computer 105 in the vehicle 101 prioritizes views from multimedia sensors 110, e.g., as represented in respective data streams 115. For example, the computer 105 could be programmed to take into account a direction of travel of the vehicle 101 as indicated by a vehicle 101 steering angle and/or data from the computer 101 indicating a vehicle 101 speed and/or transmission state, e.g., in a forward or reverse gear, etc. Alternatively or additionally, the computer 105 could be programmed to take into account data provided from the computer 130 concerning the vehicle 101 operator, e.g., a direction or change in direction of the operator's eyes, e.g., indicating that the operator was looking at a particular display 135 providing a particular data stream 115, thereby indicating that the particular data stream 115 was currently of greatest interest to the vehicle 101 operator. The computer 130, based on such data, could assign a higher priority to a data stream 115 from a multimedia sensor 110 pointing in an indicated vehicle 101 direction of travel, e.g., to the front and/or to the left of a vehicle 101 traveling forward and turning left, etc., and/or providing a data stream 115 indicated to be of interest to the vehicle 101 operator according to data from one or more sensors 145. Accordingly, prioritization of multimedia, e.g., video, data streams 115 could include a ranking, e.g., 1 through 4, etc., of video data streams 115 according to usefulness for a vehicle 101 remote operator.

Following the block 220, in a block 225, the computer 130 determines an amount of bandwidth being consumed by each of the multimedia data streams 115, e.g., in terms of bits per second, megabits per second (Mbps), etc. Alternatively or additionally, such determination could be made in the computer 105.

Following the block 225, in a block 230, the computer 105 determines an amount of available bandwidth and end-to-end delay for the multimedia data streams 115. Alternatively or additionally, such determination could be made in the computer 130. In any case, this determination could be made by sending "pings" via the network 120 as is known.

In a block 235, following the block 225, the computer 105 determines whether the available bandwidth for multimedia data streams 115 consumed as determined in the block 225 exceeds, and if so, by how much, the available bandwidth determined in the block 230. Alternatively or additionally, this determination could be made in the computer 130. In any event, if consumed bandwidth exceeds available bandwidth, then a block 240 is executed next. Otherwise, the process 200 proceeds to a block 245.

In the block 240, the computer 105 makes one or more adjustments to data streams 115 being provided to the computer 130. Alternatively or additionally, the computer 130 could determine such adjustments and could provide instructions concerning the same to the computer 105. In any case, to reduce bandwidth consumed by the multimedia data streams 115, a computer 105, 130 could determine that one or more data streams, e.g., from one or more multimedia sensors 110 in the vehicle 101, not be provided to the computer 130. For example, bandwidth consumption could be reduced where only three of four, or even two of four, available data streams 115 are provided to the computer 130 from the computer 105, e.g., according to a ranking such as determined as described above with respect to the block 220. Alternatively or additionally, bandwidth consumption could be reduced by adjusting a size or resolution of some or all of the multimedia data streams 115 being provided to the computer 130. For example, when a vehicle 101 is traveling in a forward direction, multimedia sensors 110 providing images at the left and right sides of the vehicle 101 may be less important than when the vehicle 101 is turning. Accordingly, a resolution and/or size of such image could be reduced in a data stream 115. Yet further alternatively or additionally, the computer 130 could instruct the computer 105 to adjust the position and/or orientation of one or more multimedia sensors 110 based on tracking of an operator's movements, direction of gaze, etc. Yet further or alternatively, the computer 105 may prevent at least one of the data streams 115 from being transmitted to the computer 130. Depending on the available bandwidth, the computer 105 may send only those data streams 115 highest on the prioritization and prevent transmission of the data streams 115 lowest on the prioritization until the higher priority streams have been sent and/or available bandwidth increases.

The block 245 is executed following either of the blocks 235, 240. In the block 245, the computer 130 provides an image or images (and possibly also audio and other data, as mentioned above) from one or more data streams 115 on a display or displays 135. An operator can use information from a display 135 to provide inputs to the computer 130, which in turn can provide control signals for the computer 105 to provide to vehicle 101 components, e.g., for steering, throttle control, braking control, etc.

Following the block 245, in a block 250, the computer 130 determines whether the process 200 continues. For example, remote operation of a vehicle 101 may be ended, the vehicle 101 it may be powered off, etc. Thus, the process 200 may end following the block 250. Otherwise, the process 200 may continue in the block 205.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a computer at a remote site, the computer comprising a processor and a memory; and
    a vehicle computer onboard a vehicle, the vehicle computer and the vehicle geographically remote from the computer and the remote site, the vehicle operable by an operator of the computer at the remote site, whereby the operator is geographically remote from the vehicle and the vehicle computer;
    wherein the memory of the computer at the remote site stores instructions executable by the processor of the computer at the remote site to:
        receive a plurality of data streams from the vehicle via the vehicle computer, at least some of the data streams including multimedia data;
        determine an available bandwidth and a bandwidth consumption of each of the data streams;
        perform a prioritization of the data streams according to one or more factors including at least data describing the operator at the remote site operating the vehicle and the available bandwidth, the prioritization including an identification of one of the data streams having a higher priority than another of the data streams based on sensor data indicating behavior of the operator at the remote site; and
        instruct the vehicle computer to at least one of adjust at least one of the data streams and prevent transmission of at least one of the data streams to the computer according to the prioritization.

2. The system of claim 1, wherein at least one of the data streams includes at least one of speed and steering angle data from the vehicle.

3. The system of claim 1, wherein adjusting at least one of the data streams includes adjusting at least one of a resolution and a size of an image being transmitted in the at least one of the data streams.

4. The system of claim 1, wherein some of the data streams include images from respective multimedia sensors mounted on the vehicle.

5. The system of claim 1, wherein the one or more factors include data concerning a vehicle state.

6. The system of claim 5, wherein the data concerning the vehicle state include at least one of a vehicle speed, direction of travel steering angle, steering rate of change, and an orientation of a vehicle sensor.

7. The system of claim 1, wherein at least one of the data streams includes a command to actuate a vehicle component.

8. The system of claim 1, wherein the data concerning the operator of the computer at the remote site include at least one of eye movement and a direction of gaze of the operator.

9. A method, comprising:
operating a vehicle computer onboard a vehicle with a computer at a remote site, the vehicle computer and the vehicle geographically remote from the computer and the remote site, the vehicle operable by an operator of the computer at the remote site, whereby the operator is geographically remote from the vehicle and the vehicle computer;
receiving, at the computer at the remote site, a plurality of data streams from the vehicle via the vehicle computer, at least some of the data streams including multimedia data;
determining an available bandwidth and a bandwidth consumption of each of the data streams;
performing, with the computer at the remote site, a prioritization of the data streams according to one or more factors including at least data describing the operator at the remote site operating the vehicle and the available bandwidth, the prioritization including an identification of one of the data streams having a higher priority than another of the data streams based on sensor data indicating behavior of the operator at the remote site; and
instructing the vehicle computer to at least one of adjust at least one of the data streams and prevent transmission of at least one of the data streams to the computer according to the prioritization.

10. The method of claim 9, wherein at least one of the data streams includes at least one of speed and steering angle data from the vehicle.

11. The method of claim 9, wherein some of the data streams include images from respective multimedia sensors mounted on the vehicle.

12. The method of claim 9, wherein the one or more factors include data concerning a vehicle state.

13. The method of claim 9, wherein adjusting at least one of the data streams includes adjusting at least one of a resolution and a size of an image being transmitted in the at least one of the data streams.

14. The method of claim 9, wherein at least one of the data streams includes a command to actuate a vehicle component.

15. A system, comprising:
a computer at a remote site, the computer comprising a processor and a memory; and
a vehicle computer onboard a vehicle, the vehicle computer and the vehicle geographically remote from the computer and the remote site, the vehicle operable by an operator of the computer at the remote site, whereby the operator is geographically remote from the vehicle and the vehicle computer;
wherein the computer is programmed to:
receive data from a plurality of multimedia sensors mounted on the vehicle via the vehicle computer;
determine an available bandwidth and a bandwidth consumption of each of the data streams;
perform a prioritization, according to one or more factors including at least data describing the operator at the remote site operating the vehicle and the available bandwidth, of respective data streams that each include data from one of the multimedia sensors, the prioritization including an identification of one of the data streams having a higher priority than another of the data streams based on sensor data indicating behavior of the operator at the remote site; and
instruct the vehicle computer to adjust at least one of the data streams according to the prioritization.

16. The system of claim 15, wherein the computer is programmed to provide at least one data stream via the network that includes at least one of speed and steering angle data from the vehicle.

17. The system of claim 15, wherein adjusting at least one of the data streams includes adjusting at least one of a resolution and a size of an image being transmitted in the at least one of the data streams.

* * * * *